US009580011B2

(12) United States Patent
Bang et al.

(10) Patent No.: US 9,580,011 B2
(45) Date of Patent: Feb. 28, 2017

(54) APPARATUS AND METHOD FOR CORRECTING SENSING OF SURROUNDING OBSTACLE ON CURVED ROAD

(71) Applicant: Electronics and Telecommunications Research Institute, Daejeon (KR)

(72) Inventors: Joon Hak Bang, Daegu (KR); Kee Koo Kwon, Daegu (KR); Soo In Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/489,606

(22) Filed: Sep. 18, 2014

(65) Prior Publication Data
US 2015/0266510 A1    Sep. 24, 2015

(30) Foreign Application Priority Data

Mar. 18, 2014  (KR) ......................... 10-2014-0031666

(51) Int. Cl.
| B62D 6/00 | (2006.01) |
| B60Q 9/00 | (2006.01) |
| G08G 1/16 | (2006.01) |

(52) U.S. Cl.
CPC ............... *B60Q 9/00* (2013.01); *G08G 1/166* (2013.01); *G08G 1/167* (2013.01); *B60Q 9/008* (2013.01)

(58) Field of Classification Search
CPC .................................................. B62D 15/0265
See application file for complete search history.

(56) References Cited

U.S. PATENT DOCUMENTS

| 7,783,403 | B2 * | 8/2010 | Breed ................. | B60R 21/0134 340/435 |
| 2005/0033516 | A1 * | 2/2005 | Kawasaki ............ | B60R 21/013 701/301 |
| 2005/0225477 | A1 * | 10/2005 | Cong ................. | B60K 31/0008 342/70 |
| 2012/0158248 | A1 | 6/2012 | Suk et al. | |

FOREIGN PATENT DOCUMENTS

| KR | 10-2012-0038748 | 4/2012 |
| KR | 10-1285350 | 7/2013 |
| KR | 10-2013-0096431 | 8/2013 |

* cited by examiner

*Primary Examiner* — Calvin Cheung
(74) *Attorney, Agent, or Firm* — Kile Park Reed & Houtteman PLLC

(57) ABSTRACT

Provided are an apparatus and method for correcting sensing of a surrounding obstacle on a curved road. The apparatus includes an acquisition unit configured to acquire curvature information of a curved road on which a vehicle is traveling using a steering angle value indicating a degree of rotation of a steering wheel of the vehicle, a sensing unit configured to sense another vehicle traveling behind the vehicle, and a correction unit configured to correct sensing information of the other vehicle sensed by the sensing unit using the curvature information acquired by the acquisition unit.

8 Claims, 5 Drawing Sheets

APPARATUS AND METHOD FOR CORRECTING SENSING OF SURROUNDING OBSTACLE ON CURVED ROAD

CROSS-REFERENCE TO RELATED APPLICATION

This application claims priority to and the benefit of Korean Patent Application No. 10-2014-0031666, filed on Mar. 18, 2014, the disclosure of which is incorporated herein by reference in its entirety.

BACKGROUND

1. Field of the Invention

The present invention relates to a technology for detecting a rear obstacle of a vehicle, and more particularly, to an apparatus and method for correcting sensing of a surrounding obstacle on a curved road.

2. Discussion of Related Art

In general, when a vehicle changes driving lanes, a rear radar sensor installed in the vehicle detects another vehicle that comes close from an adjacent lane behind the vehicle, and prevents an accident through an alarm or control. At this time, angle information, distance information, and speed information is obtained by detecting the other vehicle, and using the information, it is possible to determine whether or not the other vehicle is in the adjacent lane. Also, it is possible to know the distance from and the driving speed of the detected vehicle. Using such information, the rear radar sensor helps a driver in changing lanes safely.

When a vehicle travels on a straight road, information obtained by detecting another vehicle as mentioned above can be used as it is. However, there is a problem when a vehicle travels on a curved road.

For example, when a vehicle travels on a curved road as exemplified in FIG. 1, the vehicle and another vehicle in an adjacent lane behind the vehicle are not on a straight line, but deviate from each other by an angle ∠A based on the central axes of tire rotation in proportion to the curvature of the curved road. In this situation, when a rear radar sensor installed in the vehicle detects the other vehicle behind the running vehicle, the other vehicle that actually comes close from the immediately adjacent lane may be wrongly determined as being two or more lanes away from the vehicle due to angle information among pieces of information on the detected obstacle. Due to such a misjudgment, a driver may think that there is no vehicle in the lane immediately adjacent to the vehicle, and cause an accident while attempting to change lanes.

As described above, on a curved road, a running vehicle deviates from another vehicle based on the central axes of tire rotation in proportion to the curvature of the curved road, and thus it is not possible to use information obtained by detecting the other vehicle in an adjacent lane behind the vehicle as it is, unlike in a straight line. Therefore, there is a need for a method of correctly detecting another vehicle behind a vehicle during a travel on a curved road.

SUMMARY OF THE INVENTION

The present invention is directed to providing a technological way to enable a vehicle traveling on a curved road to correctly detect the position and the speed of another vehicle traveling behind the vehicle.

According to an aspect of the present invention, there is provided an apparatus for correcting sensing of a surrounding obstacle on a curved road, the apparatus including: an acquisition unit configured to acquire a steering angle value indicating a degree of rotation of a steering wheel of a vehicle and curvature information of a curved road on which the vehicle is traveling; a sensing unit configured to generate sensing information of an obstacle around the vehicle; and a correction unit configured to correct an error of the sensing information using at least one of the steering angle value and the curvature information.

According to another aspect of the present invention, there is provided a method for a sensing correction apparatus to correct sensing of a surrounding obstacle on a curved road on which a vehicle is traveling, the method including: selectively acquiring at least one of a steering angle value indicating a degree of rotation of a steering wheel of the vehicle and curvature information of a curved road on which the vehicle is traveling, through a steering angle sensor of the vehicle; generating sensing information including at least one of an angle value, a distance value, and a relative speed value between an obstacle sensed around the vehicle and the vehicle; and correcting the sensing information using at least one of the steering angle value and the curvature information.

BRIEF DESCRIPTION OF THE DRAWINGS

The above and other objects, features, and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
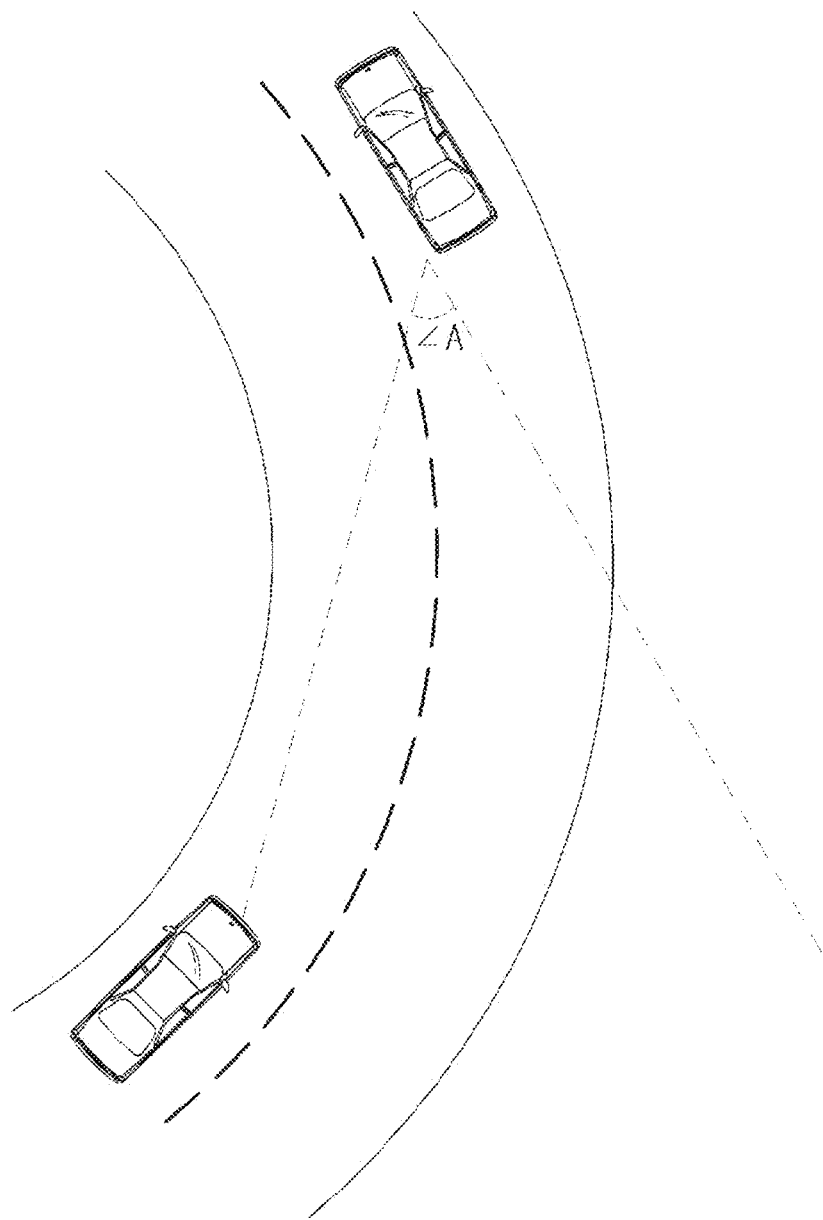
FIG. 1 shows an example of a situation in which an exemplary embodiment of the present invention is necessary.

An apparatus for correcting sensing of a surrounding obstacle on a curved road according to an aspect of the present invention includes an acquisition unit that acquires a steering angle value indicating the degree of rotation of the steering wheel of a vehicle and curvature information of a curved road on which the vehicle is traveling, a sensing unit that generates sensing information of an obstacle around the vehicle, and a correction unit that corrects an error of the sensing information using at least one of the steering angle value and the curvature information.

Here, the sensing unit calculates at least one of an angle value, a distance value, and a relative speed value between the vehicle and the obstacle.

In addition, the correction unit corrects the sensing information when the steering angle value is a previously set threshold value or more. At this time, the correction unit corrects the angle value between the vehicle and the obstacle by adding or subtracting the steering angle value to/from the angle value, and corrects the distance value between the vehicle and the obstacle using the curvature information. The distance value between the vehicle and the obstacle is corrected using the following equation employing the curvature information.

$$x = \sqrt{(d/2)^2 + \left(r - \sqrt{r^2 - (d/2)^2}\right)^2}$$

Here, d is the distance value between the vehicle and the obstacle, r is the curvature radius of the curved road, and x is half the corrected distance value.

Further, the correction unit corrects the relative speed value between the vehicle and the obstacle using the curvature information. In other words, by multiplying the relative speed value between the vehicle and the obstacle and a ratio between the distance value between the vehicle and the obstacle and the corrected distance value, the relative speed value is corrected.

Meanwhile, a method for a sensing correction apparatus to correct sensing of a surrounding obstacle on a curved road on which a vehicle is traveling includes selectively acquiring a steering angle value indicating the degree of rotation of the steering wheel of the vehicle and curvature information of a curved road on which the vehicle is traveling, generating sensing information including at least one of an angle value, a distance value, and a relative speed value between an obstacle sensed around the vehicle and the vehicle, and correcting the sensing information using at least one of the steering angle value and the curvature information.

Here, the correcting of the sensing information includes correcting the sensing information when the steering angle value is a previously set threshold value or more.

In addition, the correcting of the sensing information includes correcting the angle value between the vehicle and the obstacle by adding or subtracting the steering angle value to/from the angle value, and correcting the distance value between the vehicle and the obstacle using the following equation employing the curvature information.

$$x = \sqrt{(d/2)^2 + \left(r - \sqrt{r^2(d/2)^2}\right)^2}$$

Here, d is the distance value between the vehicle and the obstacle, r is the curvature radius of the curved road, and x is half the corrected distance value.

Further, the correcting of the sensing information includes correcting the relative speed value between the vehicle and the obstacle by multiplying the relative speed value between the vehicle and the obstacle and a ratio between the distance value between the vehicle and the obstacle and the corrected distance value.

Exemplary embodiments of the present invention will now be described more fully with reference to the accompanying drawings to clarify aspects, features, and advantages of the present invention. The invention may, however, be embodied in many different forms and should not be construed as being limited to the embodiments set forth herein. Rather, these embodiments are provided so that this disclosure will be through and complete, and will fully convey the concept of the invention to those of ordinary skill in the art. The present invention is defined by the appended claims.

Meanwhile, the terms used herein are for the purpose of describing particular exemplary embodiments only and are not intended to be limiting. As used herein, the singular forms "a," "an," and "the" are intended to include the plural forms as well, unless the context clearly indicates otherwise. It will be further understood that the terms "comprises" or "comprising," when used in this specification, do not preclude the presence or addition of one or more components, steps, operations, and/or elements other than a mentioned component, step, operation, and/or element.

Hereinafter, the present invention will be described in detail with reference to the accompanying drawings. Throughout the drawings, like numbers refer to like elements. Further, when it is determined that a detailed description of a known configuration or function related to the present invention may obscure the gist of the present invention, the detailed description will be omitted.

Figure 2:
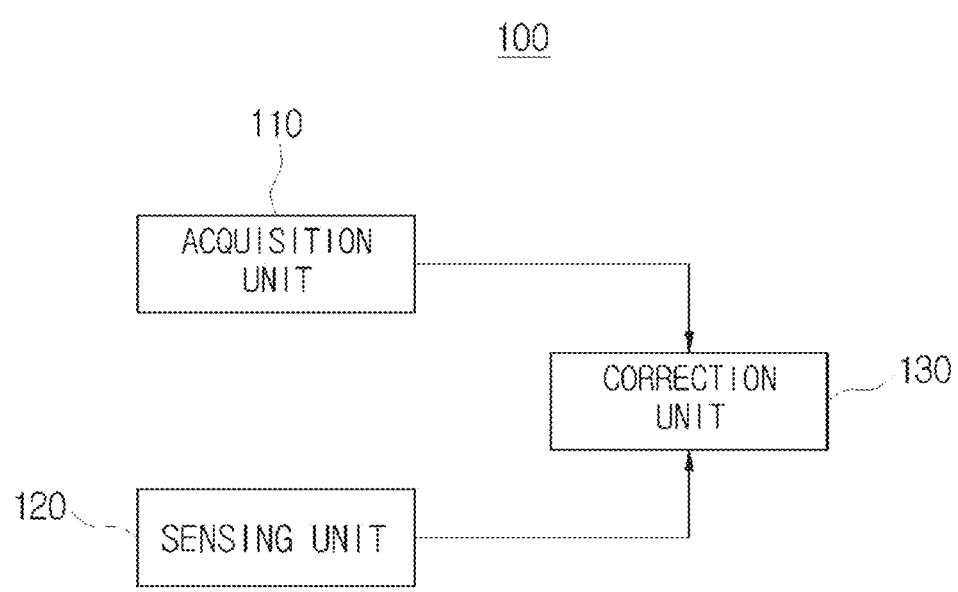
FIG. 2 is a block diagram of an apparatus for correcting sensing of a surrounding obstacle on a curved road according to an exemplary embodiment of the present invention.

FIG. 2 is a block diagram of an apparatus for correcting sensing of a surrounding obstacle on a curved road according to an exemplary embodiment of the present invention. When another vehicle is sensed while a running vehicle is traveling on a curved road, a sensing correction apparatus 100 according to an exemplary embodiment of the present invention corrects sensing information using steering information of the vehicle, thereby improving sensing performance to find the correct position of the other vehicle. To this end, the sensing correction apparatus 100 according to an exemplary embodiment of the present invention includes an acquisition unit 110, a sensing unit 120, and a correction unit 130 as shown in FIG. 2.

The acquisition unit 110 acquires the steering angle value of the vehicle and curvature information of a curved road on which the vehicle is traveling. For example, the acquisition unit 110 acquires information measured by a steering angle sensor of the vehicle (running vehicle) as the curvature information. The steering angle sensor is installed in the vehicle to measure the displacement of a steering wheel. Using the steering angle sensor, it is possible to know the degree of rotation of the steering wheel of the vehicle. To this end, the acquisition unit 110 can acquire curvature information through controller area network (CAN) communication or local interconnect network (LIN) communication.

Also, the acquisition unit 110 can acquire the curvature information of the curved road on which the vehicle is traveling from the acquired steering angle value. For example, the acquisition unit 110 can acquire the curvature information using the steering angle value and electronic control unit (ECU) information acquired from the ECU of the vehicle.

The sensing unit 120 generates sensing information of an obstacle around the vehicle.

Here, the sensing unit 120 generates the sensing information of the obstacle around the vehicle using a sensing signal received from a radar sensor installed in the vehicle. For example, the sensing unit 120 generates the sensing information by calculating at least one of an angle value, a distance value, and a relative speed value between the vehicle and the obstacle. Here, the obstacle around the vehicle is another vehicle traveling behind the vehicle on the curved road. For example, the other vehicle can be a vehicle traveling in a lane on either side of the vehicle.

The correction unit 130 corrects an error of the sensing information generated by the sensing unit 120 using at least one of the steering angle value and the curvature information acquired through the acquisition unit 110.

At this time, when the steering angle value is a threshold value or more, the correction unit 130 determines that the road on which the running vehicle is traveling is a curved road, and corrects the error of the sensing information. Here, the threshold value is a criterion for determining whether or not the vehicle is traveling on a road as much curved as error correction is necessary, and can be set in advance by an operator or a user.

When the steering angle value is the threshold value or more, in other words, when the road on which the vehicle is traveling is determined as a road as much curved as correction is necessary, the correction unit 130 corrects at least one of the angle value, the distance value, and the relative speed value between the vehicle and the obstacle. For example, when it is determined that the vehicle is traveling on a curved road, the correction unit 130 corrects all of the angle value, the distance value, and the relative speed value included in the sensing information.

The correction unit 130 corrects the angle value between the vehicle and the obstacle calculated by the sensing unit 120 by adding or subtracting the steering angle value acquired through the acquisition unit 110 to/from the angle value between the vehicle and the obstacle. For example, the correction unit 130 can calculate a corrected angle value A' by subtracting a steering angle value A" from an angle value A between the vehicle and the obstacle (A'=A−A").

Also, the correction unit 130 corrects the distance value between the vehicle and the obstacle using the curvature information acquired through the acquisition unit 110. For example, the correction unit 130 can correct the distance value between the vehicle and the obstacle using Equation 1.

$$x = \sqrt{(d/2)^2 + \left(r - \sqrt{r^2 - (d/2)^2}\right)^2}$$ [Equation 1]

Here, d is the distance value between the vehicle and the obstacle obtained from the sensing unit 120, and r is the curvature radius of the curved road. By multiplying a result value x obtained using Equation 1 by 2, the correction unit 130 can acquire a corrected distance value (d'=2x). Also, the curvature radius can be obtained through the curvature information acquired by the acquisition unit 110.

Further, when the correction unit 130 corrects the distance value, it is possible to improve the accuracy of distance value correction by repeating a recalculation process of inserting the result value x into the equation several times. In other words, while a repeat count n is increased by 1 each time until the repeat count n becomes a previously set value, the calculated result value x is inserted into Equation 1 as the distance value d. Subsequently, by multiplying $2^n$ and the result value x calculated when the repeat count n is the previously set value, the correction unit 130 can acquire a more accurately corrected distance value (d'=x×$2^n$).

Here, the previously set value can be changed in real time according to a state of the vehicle, and is set in advance and changed by the operator or the user. In other words, when the correction unit 130 corrects the distance value, the repeat count of the calculation process (Equation 1) for distance value correction is changed according to the state of the vehicle.

For example, the correction unit 130 changes the number of times of the calculation process (previously set value) for distance value correction in consideration of the curvature radius of the curved road on which the vehicle is traveling. Here, the previously set value can increase in inverse proportion to the absolute value of the curvature radius of the curved road. Alternatively, the previously set value can be changed to increase when the absolute value of the curvature radius of the curved road on which the running vehicle is traveling becomes smaller than a previously set curvature radius. In this way, by changing the number of times of the calculation process according to the curvature radius of the curved road on which the vehicle is traveling, it is possible to adjust the accuracy of correction of the distance value between the vehicle and the obstacle.

In addition, the correction unit 130 corrects the relative speed value between the vehicle and the obstacle calculated by the sensing unit 120. For example, the correction unit 130 corrects the relative speed value between the vehicle and the obstacle by calculating a ratio between the distance value d between the vehicle and the obstacle and the corrected distance value d'. In other words, the correction unit 130 can obtain a corrected speed value v' by correcting a speed value v between the vehicle and the obstacle according to Equation 2.

$$v' = v \times (d'/d)$$ [Equation 2]

Here, v is a speed value between the vehicle and the obstacle obtained through the sensing unit 120. Since a change in distance is proportional to a change in speed during the same time, the corrected speed value v' is changed as much as a ratio between the corrected distance value d' and the distance value d between the vehicle and the obstacle.

As another example, the correction unit 130 can correct only the angle value between the vehicle and the obstacle. This is because the angle value is a criterion for determining whether or not another vehicle is traveling behind the running vehicle in a lane on either side of the running vehicle. In this case, the distance value and the speed value between the vehicle and the obstacle do not considerably vary after correction, and thus are corrected only when a precise distance and speed are necessary.

As described above, according to an exemplary embodiment of the present invention, when another vehicle traveling behind a running vehicle is sensed while the vehicle is traveling on a curved road, sensing information is corrected using steering information of the vehicle, and thus the correct position of the other vehicle is found like on a straight road so that sensing performance is improved. Also, it is possible to prevent an accident that may occur when the running vehicle tries to change lanes.

Figure 3:
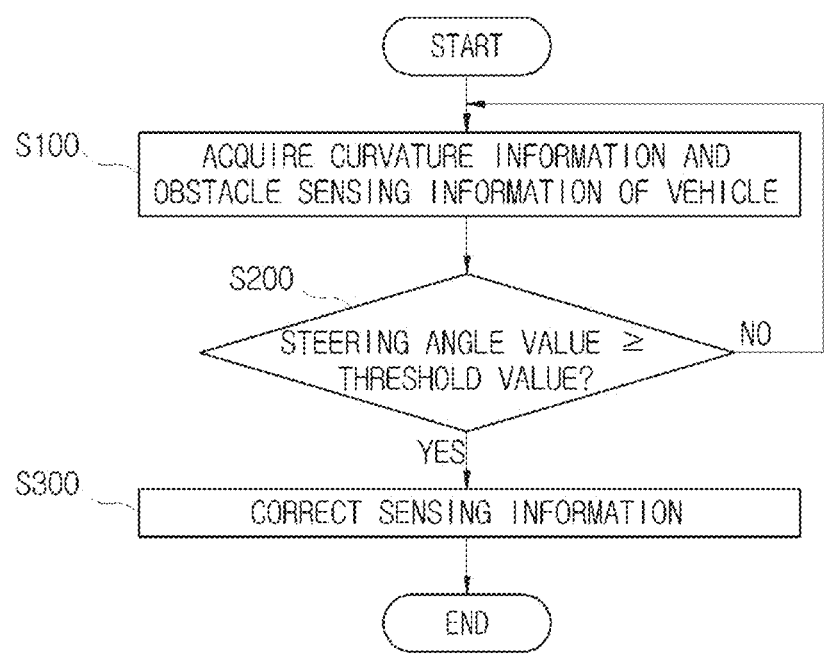
FIG. 3 is a flowchart of a method for a sensing correction apparatus to correct sensing of a surrounding obstacle on a curved road according to another exemplary embodiment of the present invention.

FIG. 3 is a flowchart of a method for a sensing correction apparatus to correct sensing of a surrounding obstacle on a curved road according to another exemplary embodiment of the present invention.

In step 100, the sensing correction apparatus 100 acquires curvature information of a road on which a vehicle (running vehicle) is traveling and sensing information of an obstacle around the vehicle.

Here, the curvature information can include a steering angle value acquired through the steering angle sensor of the vehicle. For example, the sensing correction apparatus 100 can selectively acquire at least one of the steering angle value indicating the degree of rotation of a steering wheel based on the central axis of tire rotation of the vehicle and the curvature information of a curved road on which the vehicle is traveling. Using the steering angle value, it is possible to calculate a curvature radius included in the curvature information.

In addition, the sensing correction apparatus 100 generates and acquires sensing information including at least one of an angle value, a distance value, and a relative speed value between the obstacle sensed around the vehicle and the vehicle. For example, the sensing information includes all of the angle value, the distance value, and the relative speed value between the obstacle sensed around the vehicle and the vehicle. Here, the obstacle is another vehicle traveling behind the vehicle on the curved road, and can be a vehicle traveling in a lane on either side of the vehicle.

In step 200, the sensing correction apparatus 100 checks whether the steering angle value is a threshold value or more. When it is checked in step 200 that the steering angle value is the threshold value or more, the sensing correction apparatus 100 corrects the sensing information in step 300.

For example, when the steering angle value is the threshold value or more, the sensing correction apparatus 100 determines that the vehicle is traveling on a road as much curved as error correction is necessary, and corrects the sensing information. Here, the threshold value is a criterion for determining whether the vehicle is traveling on a road as much curved as error correction is necessary, and can be set in advance by an operator or a user.

When the steering angle value is the threshold value or more, in other words, when the road on which the vehicle is traveling is determined as a road as much curved as correction is necessary, the sensing correction apparatus 100 corrects the angle value, the distance value, and the relative speed value between the vehicle and the obstacle.

Figure 4:
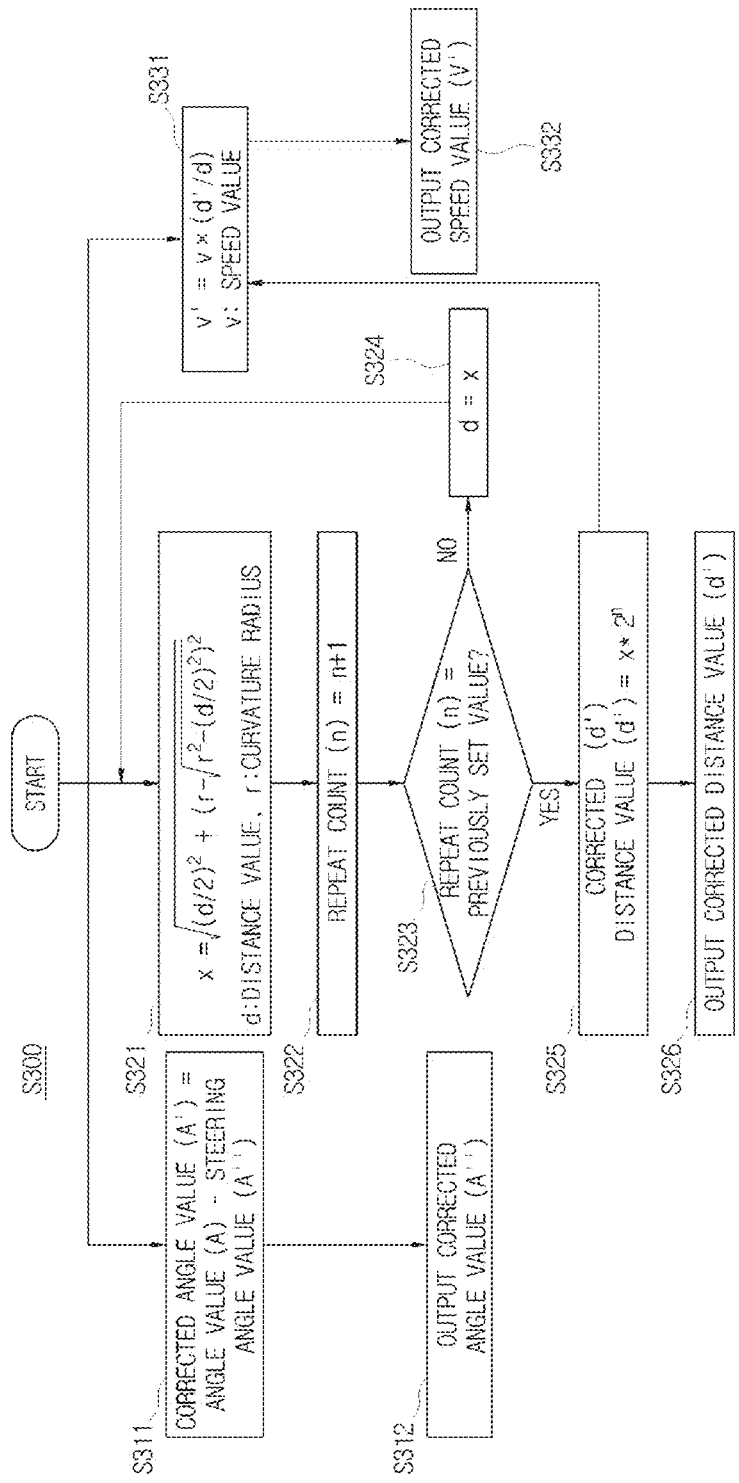
FIG. 4 is a detailed flowchart of the method for a sensing correction apparatus to correct sensing of a surrounding obstacle on a curved road according to the other exemplary embodiment of the present invention.

With reference to FIG. 4, a method of correcting the sensing information in step 300 will be described in detail below.

FIG. 4 is a detailed flowchart of the method for a sensing correction apparatus to correct sensing of a surrounding obstacle on a curved road according to the other exemplary embodiment of the present invention.

According to three cases of correcting an angle value, a distance value, and a speed value, the sensing correction apparatus 100 corrects sensing of a surrounding obstacle on a curved road.

First, in the case of correcting the angle value between the vehicle and the obstacle, the sensing correction apparatus 100 corrects an angle value A between the vehicle and the obstacle by adding or subtracting a steering angle value A" of the vehicle to/from the angle value A in step 311. Preferably in step 312, the sensing correction apparatus 100 outputs a corrected angle value A' by subtracting the steering angle value A" from the angle value A between the vehicle and the obstacle.

Second, in the case of correcting the distance value between the vehicle and the obstacle, the sensing correction apparatus 100 obtains a result value x using the curvature information and Equation 1 in step 321. At this time, when the sensing correction apparatus 100 corrects the distance value, it is possible to improve the accuracy of distance value correction by repeating a recalculation process of inserting the result value x into the equation (Equation 1) several times. In other words, a repeat count n is increased from 0 by 1 each time in step 322, and it is checked in step 323 whether the repeat count n becomes a previously set value. When the repeat count n is not the previously set value, the sensing correction apparatus 100 inserts the calculated result value x into Equation 1 as the distance value d in step 324, and performs the recalculation process using Equation 1 in step 321.

Here, the previously set value can be changed in real time according to the state of the vehicle, and is set in advance and changed by the operator or the user. In other words, when the sensing correction apparatus 100 corrects the distance value, the repeat count of the calculation process of steps 323 and 324 for distance value correction is changed according to the state of the vehicle. For example, the number of times (previously set value) of the calculation process for distance value correction is changed in consideration of the curvature radius of the curved road on which the vehicle is traveling. Here, the previously set value can increase in inverse proportion to the absolute value of the curvature radius of the curved road. Alternatively, the previously set value can be changed to increase when the absolute value of the curvature radius of the curved road on which the running vehicle is traveling becomes smaller than a previously set curvature radius.

In this way, by changing the number of times of the calculation process for distance value correction according to the curvature of the curved road on which the vehicle is traveling, it is possible to adjust the accuracy of distance value correction.

When the calculation repeat count n becomes the previously set value in step 324, the sensing correction apparatus 100 calculates a corrected distance value (d'=x×2") by multiplying 2" and the result value x calculated at this time in step 325, and outputs the corrected distance value d' in step 326.

Third, in the case of correcting the relative speed value between the vehicle and the obstacle, the sensing correction apparatus 100 calculates a ratio between the distance value d between the vehicle and the obstacle and the corrected distance value d' and corrects a relative speed value v between the vehicle and the obstacle. In other words, the sensing correction apparatus 100 calculates the corrected speed value v', which is obtained by correcting a speed value v between the vehicle and the obstacle, using Equation 2, and outputs the corrected speed value v' in step 332.

Figure 5:
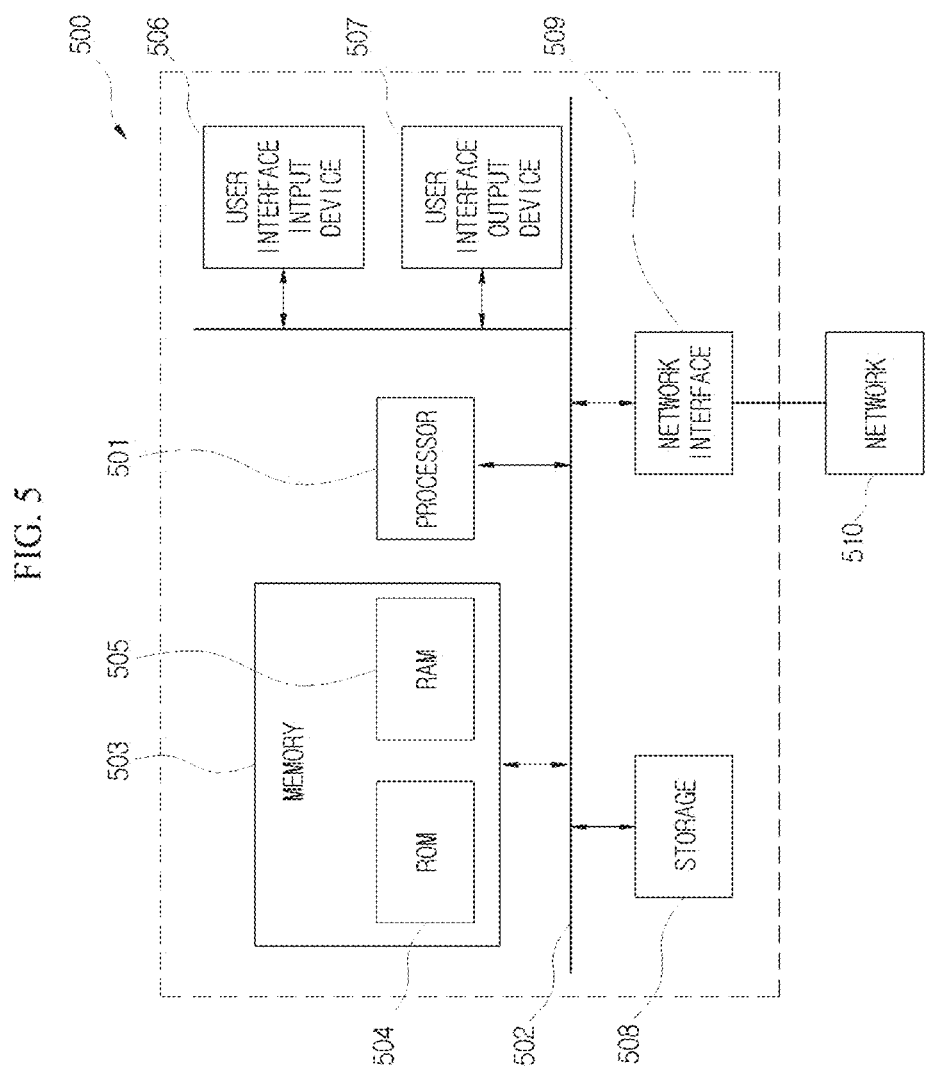
FIG. 5 is block diagram illustrating a computer system for implementing a sensing correction apparatus.

An embodiment of the present invention may be implemented in a computer system, e.g., as a computer readable medium. As shown in FIG. 5, a computer system 500 may include one or more of a processor 501, a memory 503, a user input device 506, a user output device 507, and a storage 508, each of which communicates through a bus 502. The computer system 500 may also include a network interface 509 that is coupled to a network 510. The processor 501 may be a central processing unit (CPU) or a semiconductor device that executes processing instructions stored in the memory 503 and/or the storage 508. The memory 503 and the storage 508 may include various forms of volatile or non-volatile storage media. For example, the memory may include a read-only memory (ROM) 504 and a random access memory (RAM) 505.

Accordingly, an embodiment of the invention may be implemented as a computer implemented method or as a non-transitory computer readable medium with computer executable instructions stored thereon. In an embodiment, when executed by the processor, the computer readable instructions may perform a method according to at least one aspect of the invention.

According to exemplary embodiments of the present invention, when another vehicle traveling behind a running vehicle is sensed while the running vehicle is traveling on a curved road, sensing information is corrected using steering information of the running vehicle, and thus the correct position of the other vehicle is found like on a straight road so that sensing performance is improved. Also, it is possible to prevent an accident that may occur when the running vehicle tries to change lanes.

It will be apparent to those skilled in the art that various modifications can be made to the above-described exemplary embodiments of the present invention without departing from the spirit or scope of the invention. Thus, it is intended that the present invention cover all such modifications provided they come within the scope of the appended claims and their equivalents.

What is claimed is:

1. An apparatus for correcting sensing information between a vehicle traveling in a lane of a curved road and an obstacle sensed around the vehicle, the apparatus comprising:
 a processor configured to
  acquire, by an acquisition unit, a steering angle value indicating a degree of rotation of a steering wheel of a vehicle and curvature information of the curved road;
  generate, by a sensing unit, the sensing information between the vehicle and the obstacle by measuring at least one of an angle value between the vehicle and the obstacle, a distance between the vehicle and the obstacle, and a speed value between the vehicle and the obstacle;
  correct, by a correction unit, the sensing information using at least one of the steering angle value and the curvature information to generate a corrected sensing information,
  wherein the correction unit corrects the sensing information when the steering angle value is a previously set threshold value or more,
  wherein the corrected sensing information is used to determine whether or not the obstacle is in a lane adjacent to the lane of the curved road, and
  wherein the correction unit corrects the relative speed value between the vehicle and the obstacle by multiplying the relative speed value between the vehicle and the obstacle and a ratio between the distance value between the vehicle and the obstacle and a corrected distance value between the vehicle and the obstacle; and
 perform control of the vehicle.

2. The apparatus of claim 1, wherein the correction unit corrects the angle value between the vehicle and the obstacle by adding or subtracting the steering angle value to/from the angle value between the vehicle and the obstacle.

3. The apparatus of claim 1, wherein the correction unit corrects at least one of the distance value and the relative speed value between the vehicle and the obstacle using the curvature information.

4. The apparatus of claim 1, wherein the correction unit corrects the distance value between the vehicle and the obstacle using the following equation employing the curvature information:

$$x = \sqrt{(d/2)^2 + \left(r - \sqrt{r^2 - (d/2)^2}\right)^2}$$

where d is the distance value between the vehicle and the obstacle, r is a curvature radius of the curved road, and x is half a corrected distance value.

5. A method for correcting sensing information between a vehicle traveling in a lane of a curved road and an obstacle sensed around the vehicle to provide a corrected sensing information to control the vehicle to prevent collision between the vehicle and the obstacle, the method comprising:

selectively acquiring at least one of a steering angle value indicating a degree of rotation of a steering wheel of the vehicle and curvature information of the curved road, through a steering angle sensor of the vehicle;
 generating the sensing information between the vehicle and the obstacle by measuring at least one of an angle value, a distance value, and a relative speed value between the vehicle and the obstacle;
 correcting the sensing information, by a processor, using at least one of the steering angle value and the curvature information to generate the corrected sensing information,
 wherein the correcting of the sensing information includes correcting the angle value between the vehicle and the obstacle by adding or subtracting the steering angle value to/from the angle value between the vehicle and the obstacle,
 wherein the corrected sensing information is used to determine whether or not the obstacle is in a lane adjacent to the lane of the curved road, and
 wherein the correcting of the sensing information includes correcting the relative speed value between the vehicle and the obstacle by multiplying the relative speed value between the vehicle and the obstacle and a ratio between the distance value between the vehicle and the obstacle and a corrected distance value between the vehicle and the obstacle; and
 performing the control of the vehicle.

6. The method of claim 5, wherein the correcting of the sensing information includes correcting the sensing information when the steering angle value is a previously set threshold value or more.

7. The method of claim 5, wherein the correcting of the sensing information includes correcting the distance value between the vehicle and the obstacle using the following equation employing the curvature information:

$$x = \sqrt{(d/2)^2 + \left(r - \sqrt{r^2 - (d/2)^2}\right)^2}$$

where d is the distance value between the vehicle and the obstacle, r is a curvature radius of the curved road, and x is half a corrected distance value.

8. A method for determining a driving lane in a curved road in which a vehicle is travelling and an adjacent lane in the curved road in which an obstacle sensed around the vehicle is located using a sensing information to control the vehicle to prevent collision between the vehicle and the obstacle, the method comprising:
 measuring a steering angle value indicating a degree of rotation of a steering wheel of the vehicle by measuring a central axis of tire rotation of the vehicle;
 measuring an angle value between the vehicle and the obstacle;
 correcting the angle value by using the steering angle to output a corrected angle value;
 measuring a distance value between the vehicle and the obstacle;
 measuring a curvature radius of the curved road by using the steering angle value;
 correcting the distance value by using the curvature radius to output a corrected distance value;
 measuring a speed value between the vehicle and the obstacle;

correcting the speed value by using the corrected distance value and the distance value to output a corrected speed value;
correcting the sensing information by using the corrected angle value, the corrected distance value, and the corrected speed value to output a corrected sensing information,
wherein the correcting of the sensing information includes correcting the relative speed value between the vehicle and the obstacle by multiplying the relative speed value between the vehicle and the obstacle and a ratio between the distance value between the vehicle and the obstacle and a corrected distance value between the vehicle and the obstacle;
determining the driving lane and the adjacent lane by using the corrected sensing information; and
performing the control of the vehicle.

* * * * *